United States Patent
Hayashi

(10) Patent No.: US 7,133,199 B2
(45) Date of Patent: Nov. 7, 2006

(54) TRANSMISSION TYPE ILLUMINATION DEVICE FOR STEREOMICROSCOPES, AND STEREOMICROSCOPE

(75) Inventor: Kazuhiro Hayashi, Akishima (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/693,924

(22) Filed: Oct. 28, 2003

(65) Prior Publication Data

US 2004/0085638 A1    May 6, 2004

(30) Foreign Application Priority Data

Oct. 30, 2002   (JP)   ............................. 2002-316219

(51) Int. Cl.
    *G02B 21/06*      (2006.01)
(52) U.S. Cl. ..................................... 359/385
(58) Field of Classification Search ................ 359/385, 359/389, 372–377, 599, 601, 613, 625, 619
    See application file for complete search history.

(56) References Cited

U.S. PATENT DOCUMENTS 6,252,717 B1*   6/2001  Grosskopf .................. 359/619
6,396,628 B1*   5/2002  Osa et al. .................... 359/385
6,636,363 B1*  10/2003  Kaminsky et al. .......... 359/707

\* cited by examiner

*Primary Examiner*—Alessandro Amari
(74) *Attorney, Agent, or Firm*—Kenyon & Kenyon LLP

(57) ABSTRACT

The invention has for its object to provide a transmission type illumination device for a stereomicroscope capable of observing objects over a wide magnification range wherein a diffuser that provides a surface light source and an optical element having a periodical structure in a one-dimensional direction are used in combination thereby achieving illumination with reduced field variations. This device is at least made up of, in order from a light source, a collector lens, a diffuser and a convex lens $4b$. In the vicinity of the lens $4b$ located nearest to the side of a viewing surface 5, there is provided an optical element having a periodical structure in a one-dimensional direction. With respect to the angle $\alpha$ for splitting the incident light beam, the optical element 7 having a periodical structure in a one-dimensional direction satisfies the condition $0.5D/L < \tan\alpha < 0.9D/L$ where D is the effective diameter of the secondary light source, and L is the distance from the optical element having a periodical structure in a one-dimensional direction to the secondary light source.

3 Claims, 4 Drawing Sheets

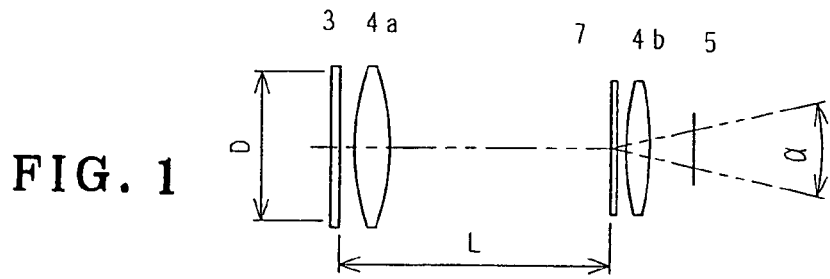
FIG. 1
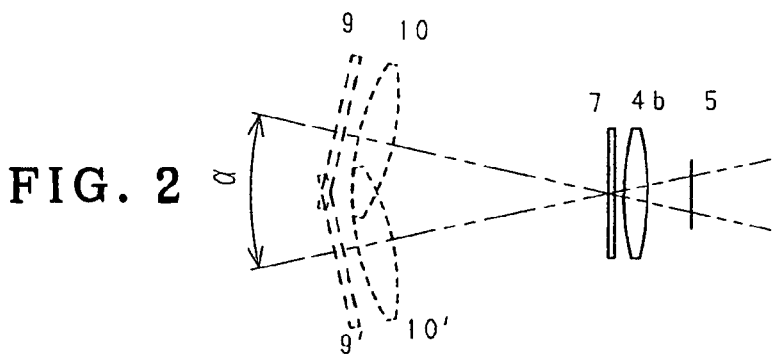
FIG. 2
FIG. 3(a)
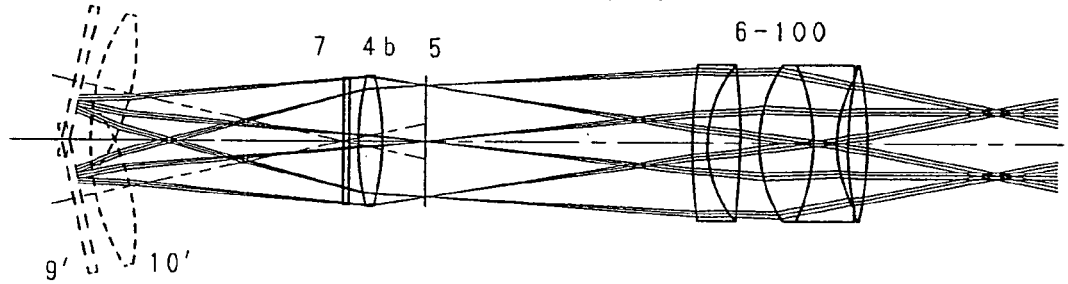
FIG. 3(b)
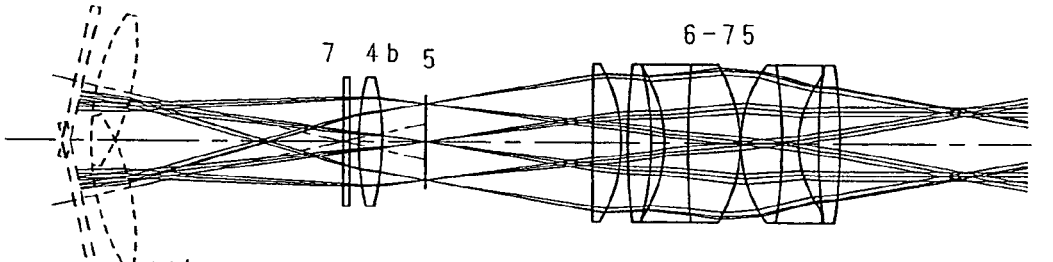
FIG. 3(c)
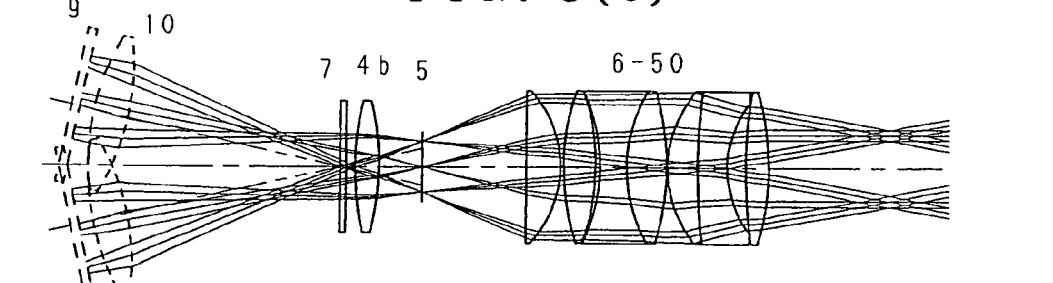

TRANSMISSION TYPE ILLUMINATION DEVICE FOR STEREOMICROSCOPES, AND STEREOMICROSCOPE

This application claims benefit of Japanese Application No. 2002-316219 filed in Japan on Oct. 30, 2002, the contents of which are incorporated herein by this reference.

BACKGROUND OF THE INVENTION

The present invention relates generally to a transmission type illumination device for stereomicroscopes and a stereomicroscope, and more particularly to a transmission type illumination device for a stereomicroscope that can incorporate a viewing optical arrangement comprising a pair of left and right zooming optical systems toward the front of a microscope or a viewing optical system comprising an objective lens common to a pair of left and right zooming optical systems to view stereoscopic images.

Transmission type illumination devices for stereomicroscopes known so far in the art comprise an optical element having a periodical structure in a one-dimensional direction (hereinafter called the prism sheet) or a similar member for the purpose of making improvements in illumination variations and illumination efficiency, as typically set forth in the following patent publications 1 and 2.

Patent Publication 1
JP-U 51-82466
Patent Publication 2
JP-A 5-40226

For stereomicroscopes, there is now a growing demand toward having a much wider range of variable viewing magnification. FIGS. 5(a), 5(b) and 5(c) are illustrative of how to vary magnification by means of a zoom lens (not shown). That is, there are shown optical paths of back ray tracing for the light beams necessary for illumination of the whole field of view from an objective lens 6 to a diffuser 3 in the illumination system. Reference numeral 1 stands for a light source, 2 a collector lens, 3 a diffuser, 4a a convex lens located in the vicinity of the diffuser 3, 4b a convex lens located in the vicinity of a viewing surface 5, 5 a viewing surface (or viewing position), 6 an objective lens, p a pupil of a viewing system, and p' a positive conjugate to p.

As can be seen from FIG. 5, the position p' conjugate to the pupil p of the viewing system and its magnitude change largely with a magnification change by the zoom lens located in the viewing optical system, and the angle of incidence on the diffuser 3 of a light beam arriving at each point on the field of view varies. Generally, the reason the magnitudes of the pupil p and p' vary for each magnification is that as the magnification of the viewing optical system becomes high, its angular aperture becomes large.

The above phenomena become much more noticeable when this zoom lens is used in combination with the objective lens 6 having a different focal length to enlarge the range of magnification where images can be viewed. Until now it is still difficult to achieve illumination with reduced field variations by means of a single arrangement while light beams are allowed to meet the requirements for the pupil p and p' over such a wide magnification range.

FIG. 6(a) is illustrative of optical paths from a light source 1 to an objective lens 6-100 in a stereomicroscope on which the objective lens 6-100 having a long focal length (f=100 mm) is mounted. As shown, there is provided a collector lens 2 for converting light from the light source 1 to a generally parallel light beam, a diffuser 3 for receiving a light beam from the collector lens 2 to form a secondary light source of surface shape, and a convex lens system comprising a convex lens 4a located near the diffuser 3 for converting a light beam diverging from the diffuser 3 into a converging light beam to be directed to an object on a viewing surface 5 and a convex lens 4b located near the viewing surface 5.

When the objective lens 6-100 has a long focal length (f=100 mm) as shown in FIG. 6(a), there is no shading because a light beam reaching the periphery of the field of view of the viewing surface 5 is guided to the diffuser 3 as viewed in back ray tracing. When an objective lens 6-50 having a short focal length (f=50 mm) is provided as shown in FIG. 6(c), however, shading occurs because a light beam reaching the periphery of the field of view of a viewing surface 5 deviates from the illumination optical system, as viewed in back ray tracing. Referring here to FIG. 6(b) wherein an objective lens 6-75 has an intermediate focal length (f=75 mm), there is again no shading because a light beam reaching the periphery of the field of view of a viewing surface 5 is guided to a diffuser 3 as viewed in back ray tracing.

SUMMARY OF THE INVENTION

In view of such problems with the prior art as described above, an object of the present invention is to achieve illumination with reduced field variations even when images are viewed over a wide magnification range. Another object of the present invention is to provide a stereomicroscope capable of such illumination.

According to the invention, these objects are accomplished by the provision of a transmission type illumination device for stereomicroscopes, at least comprising, in order from a light source, a collector lens, a diffuser and a convex lens, wherein an optical element having a periodical structure in a one-dimensional direction is located in the vicinity of a lens located nearest to a viewing surface side.

Preferably in this case, the optical element having a periodical structure in a one-dimensional direction satisfies the following condition (1) with respect to an angle α for splitting a light beam incident on the optical element.

$$0.5 D/L < \tan \alpha < 0.9 D/L \quad (1)$$

Here D is the effective diameter of a secondary light source, and L is the distance from the optical element having a periodical structure in a one-dimensional direction to the secondary light source.

The present invention also provides a stereomicroscope incorporating a transmission type illumination system at least comprising in order from a light source a collector lens and a diffuser, which further comprises a transmission type illumination device wherein the angular aperture for illumination of an image under observation fully satisfies a pupil of a viewing optical system, and has an aspect ratio is 1:1.2 to 1:2.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIG. 1 is illustrative in section of the positions of the diffuser and prism sheet that forms a part of the transmission type illumination device for stereomicroscopes according to the invention.

FIG. 2 is illustrative of why two diffusers are virtually provided by the prism sheet of FIG. 1.

FIGS. 3(a), 3(b) and 3(c) are optical path diagrams illustrative of how a shading-free illumination system is achievable by means of the transmission type illumination device for stereomicroscopes according to the invention.

DESCRIPTION OF THE PREFERRED EMBODIMENTS

An account is now given of the fundamental principles of the inventive transmission type illumination device for stereomicroscopes and the inventive stereomicroscope incorporating the same as well as some embodiments.

When the range of magnification where images are viewed is as wide as described above, the position of p' conjugate to the pupil and its magnitude vary largely. To obtain uniform illumination in every state, it is thus required to use a surface light source of some large size.

In addition to the arrangement shown in FIG. 6, the invention is designed such that a prism sheet 7 is located in the vicinity of a convex lens 4b nearest to a viewing surface 5 as shown in FIG. 1. This prism sheet 7 acts to split the incident light beam in left and right directions, so that the illumination light beam is split in two directions as shown in FIG. 1. As viewed from the side of the viewing surface 5, this is tantamount to two surface light sources 9 and 9' being virtually found as shown by dotted lines in FIG. 2.

Figure 6A:
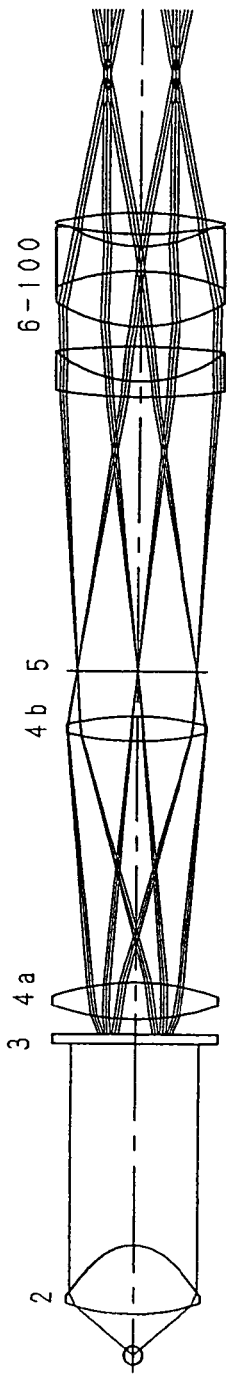
FIGS. 6(a), 6(b) and 6(c) are optical path diagrams illustrative of how light beams reaching the periphery of the field of view of the viewing surface deviate from the illumination optical system as viewed in back ray tracing, when an objective lens having a long focal length is changed over to an objective lens having a short focal length.
Figure 6B:
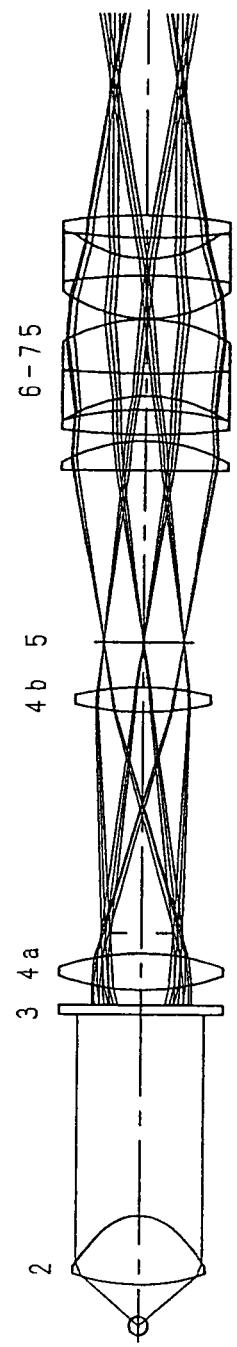
Figure 6C:
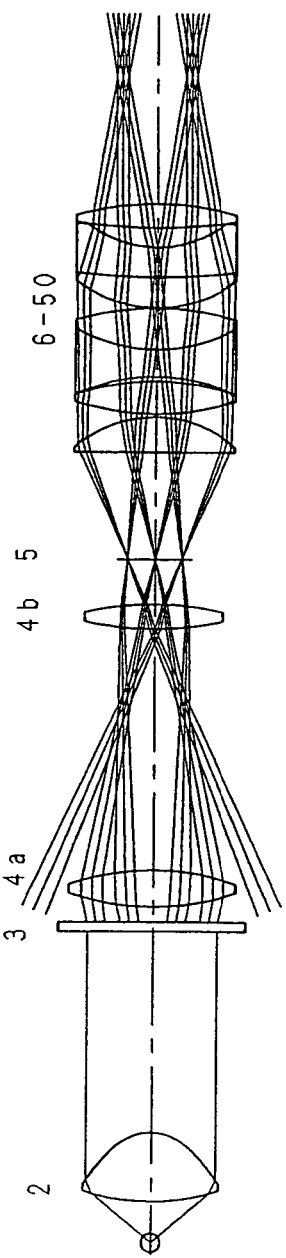

With such an arrangement as described above, it is thus possible to achieve a shading-free illumination system using the objective lens 6 having a focal length of, for instance, the order of 100 mm to 50 mm, as shown in FIGS. 3(a), 3(b) and 3(c) corresponding to FIGS. 6(a), 6(b) and 6(c), respectively. Even with an objective lens 6-50 having a short focal length (f=50 mm), too, there is no shading because, as shown in FIG. 6(c), a light beam reaching the periphery of the field of view of a viewing surface 5 is guided to two such split surface light sources 9 and 9'.

Figure 4:
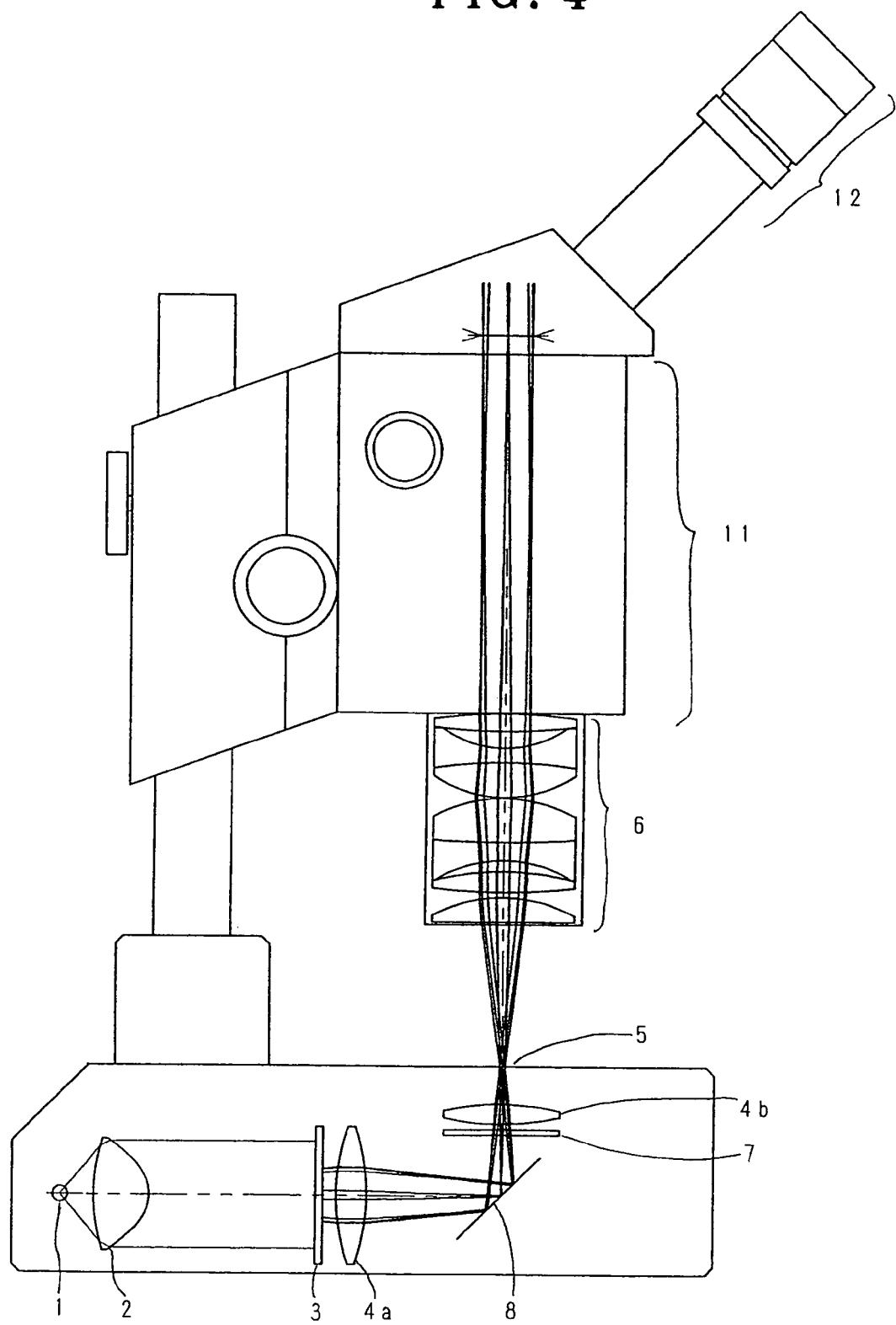
FIG. 4 is an optical path diagram illustrative of one embodiment of the transmission type illumination device for stereomicroscopes according to the invention.
Figure 5A:
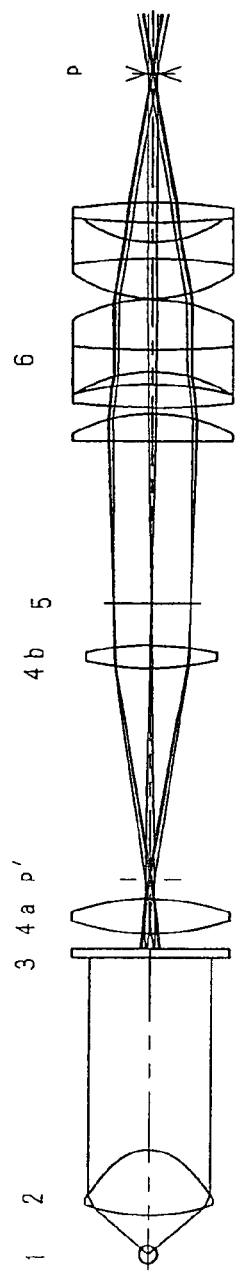
FIGS. 5(a), 5(b) and 5(c) are back-tracing optical path diagrams illustrative of how the pupil P of the viewing system, the position P' conjugate to P and the light beam diameter vary in diverse ways upon magnification changes by a zoom lens.
Figure 5B:
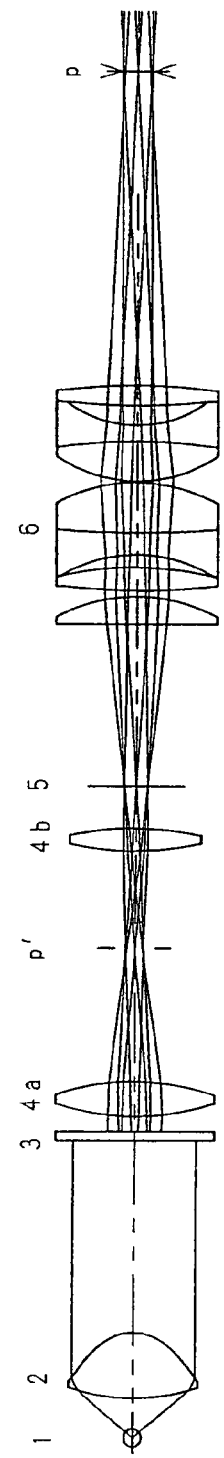
Figure 5C:
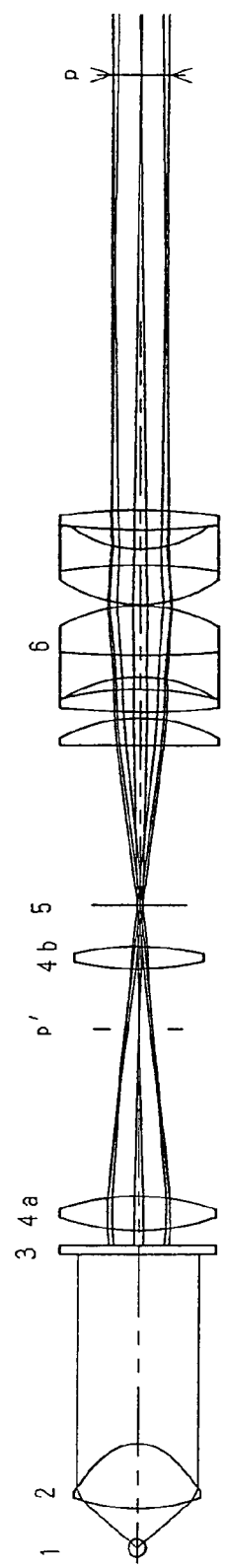

FIG. 4 is illustrative of one embodiment of the transmission type illumination device for stereomicroscopes according to the invention. In the illumination optical system of the invention, light leaving a light source 1 is collimated by a collector lens 2 into a generally parallel light beam, which is then guided to a diffuser 3. Generally uniform light strikes upon the diffuser 3, forming a large, uniform surface light source. Then, convex lenses 4a and 4b are provided for converting a light beam diverged through the diffuser 3 into a convergent light beam for illumination of an object under observation on the viewing surface 5. A prism sheet 7 is located in the vicinity of the convex lens 4b nearer to the object under observation. Light from the light source 1 is deflected upwardly at a deflection mirror 8, arriving at the prism sheet 7.

In FIG. 4, an optical arrangement located above an objective lens 6 and comprising a zooming optical system 11 and an eyepiece optical system 12 is not shown. In FIG. 4, how the light beam is split is not again shown because the prism sheet 7 does not act to split the light beam in the direction shown in FIG. 4 (within the plane).

To allow virtual two surface light sources 9 and 9' to have some extents in the left and right directions, the spacing L between the diffuser 3 and the prism sheet 8 must be large to some degrees. When the objective lens 6-50 has a short focal length as shown in FIG. 6(c), it is evident that the necessary light beam diameter becomes sharply large from a certain point. It is thus desired that the prism sheet 7 be located nearer to the viewing surface 5 rather than this. To adapt to an objective lens having a shorter focal length, it is desired that the prism sheet be as close to the viewing surface 5 as possible.

However, when the prism sheet 7 is too close to the viewing surface 5 or the prism sheet has a rough pitch, an object under observation is seen as if the pattern of the prism sheet 7 was superimposed thereon. In the instant embodiment, therefore, the prism sheet 7 is spaced 10 to 25 mm away from the viewing surface 5 (or it is located in the vicinity of the convex lens 4b nearest to the viewing surface 5). At too fine a pitch, the prism sheet 7 also acts as a diffraction grating. In other words, the appropriate pitch range should be 0.1 to 0.01 mm. For the purpose of restricting the spreading of the light beam diameter necessary for illumination when an objective lens 6-100 is used as shown in FIG. 6(a), the convex lens 4b is located at a position nearest to the viewing surface 5.

Unless virtual two surface light sources 9 and 9' resulting from the prism sheet 7 are spaced from each other at a given or longer distance in the left and right directions toward the front of the microscope, then they fail to provide large surface light sources. Thus, when the prism sheet 7 is used in combination with the objective lens 6-50 having a short focal length, it is impossible to eliminate shading. If the two surface light sources 9 and 9' are completely separated from each other, an object under observation is illuminated at an unnatural illumination angle insufficient to cover the whole field of view. In other words, it is desired that the angle α of a light ray split by the prism sheet 7 be within the range defined by the following condition (1).

$$0.5D/L < \tan \alpha < 0.9D/L \tag{1}$$

Here D is the effective diameter of the surface light source 3, and L is the distance from the prism sheet 7 to the surface light source 3.

In general, when an object lens having a short focal length (of about 70 mm or less) is used, shading is likely to occur because the light beam necessary for illumination of the periphery of the field of view deviates from an illumination optical system. For instance, this shading may be prevented by adding another concave lens 4a to the vicinity of the concave lens 4b nearest to the viewing surface 5 or using a convex lens having a shorter focal length in place of the convex lens 4b.

In this case, every time the user of the stereomicroscope replaces the objective lens with one having a different focal length, it is required to make an appropriate switchover between the optical paths through the illumination optical system. With the above illumination device of the invention, however, it is unnecessary to make such a switchover for each replacement of the objective lens 6, ensuring much more improved usability and much more efficient viewing.

The present invention has a spillover feature in view of how an object under observation is viewed. With a stereomicroscope, a viewer will observe an object under observation at two different left and right angles and perceive a stereoscopic effect from two images produced from the resulting parallax. However, there is too large a difference between the left and right images due to shades, etc. applied to an object under observation having a stereoscopic structure. In such a case, the viewer will experience eye fatigue upon continued viewing of each image over an extended period of time. To achieve viewing with reduced eye fatigue while keeping an appropriate stereoscopic effect, it is preferable to provide illumination wherein shades applied to the object in the horizontal direction are reduced while more shades are added thereto in the vertical direction.

In the arrangement of the invention, a light beam emitted from the surface light source 3 forms a surface light source larger than the light beam diameter necessary for meeting the pupil p of the viewing system. It follows that the illumination light illuminates an object under observation with an angular aperture larger than that of the viewing system. In addition, the prism sheet 7 is provided while the surface light source 3 is virtually split into two parts, so that the object under observation can be illuminated at much larger angles in the left and right directions. With such an arrangement, shades are less likely to add to the object under observation in the horizontal direction but more shades are applied to the object in the vertical direction. It is thus possible to lessen eye fatigue on long observations while keeping an appropriate stereoscopic effect.

Referring to the requirement for such illumination, the aspect ratio of the angular aperture for illumination should be at least 1:1.2 such that the pupil of the viewing system is fully satisfied in any directions and the angular aperture for illumination becomes large in the left and right directions toward the microscope. However, it is noted that the aspect ratio of the angular aperture for illumination is preferably in the range of 1:1.2 to 1:2 because at an aspect ratio of greater than 1:2, the stereoscopic effect is too exaggerated, resulting in unnatural viewing. For the illumination optical system of the invention, the angle α of a light ray split by the prism sheet 7 is thus defined by $$0.5D/L < \tan \alpha < 0.9D/L \quad (1)$$

The prism sheet 7 used herein has a similar shape as shown in FIG. 2 of Patent Publication 2. The present invention can provide an easier-to-use stereomicroscope wherein the prism sheet 7 is combined with the diffuser 3 to set up an illumination optical system that can appropriately be applied to a plurality of objective lenses without making any modification thereto.

While the embodiment of the invention as explained above and shown in the accompanying drawings has been described as a Galilean type stereomicroscope, it is understood that similar effects are obtainable with a Greenough type stereomicroscope, too.

As can be understood from the foregoing, the present invention provides a transmission type illumination device for stereomicroscopes and a stereomicroscope, wherein the diffuser to provide a surface light source and the optical element having a periodical structure in a one-dimensional direction are used in combination so that even when the zoom magnification is varied or the focal length of an associated objective lens is varied between about 100 mm and about 50 mm, illumination with extremely reduced variations is achievable without making any modification thereto. Replacement or addition of an objective lens ensures that with a stereomicroscope usable in a wide magnification range, illumination with little or no variations is achievable at any desired magnification without a switchover of a part of optical paths through an illumination optical system and addition of a further element.

I claim:

1. A transmission type illumination device for stereomicroscopes, at least comprising:
   a light source;
   a collector lens located on an exit side of said light source;
   a diffuser located on an exit side of said collector lens;
   a convex lens located on an exit side of said diffuser;
   a deflection mirror located on an exit side of said convex lens to change an optical axis of said light source;
   at least one lens element located on an exit side of said deflection mirror and nearest to a view surface side; and
   an optical element having a periodical structure in a one-dimensional direction, said optical element being interposed between said deflection mirror and said at least one lens element.

2. The transmission type illumination device according to claim 1, wherein the optical element having a periodical structure in a one-dimensional direction satisfies the following condition (1) with respect to an angle a for splitting a light beam incident on the optical element:

$$0.5D/L < \tan \alpha < 0.9D/L \quad (1)$$

where D is a effective diameter of a secondary light source, and L is a distance from the optical element having a periodical structure in a one-dimensional direction to the secondary light source.

3. A stereomicroscope incorporating a transmission type illumination system which comprises a transmission type illumination device according to claim 1, wherein an angular aperture for illumination of an object under observation fully satisfies a pupil of a viewing optical system, wherein said angular aperture has an aspect ratio of 1:1.2 to 1:2.

* * * * *